Dec. 23, 1947.     L. R. BUCKENDALE ET AL     2,432,983
BRAKE MECHANISM
Filed Oct. 28, 1944     2 Sheets-Sheet 1

Inventor
LAWRENCE R. BUCKENDALE
RALPH K. SUPER

By Strauch & Hoffman
Attorneys

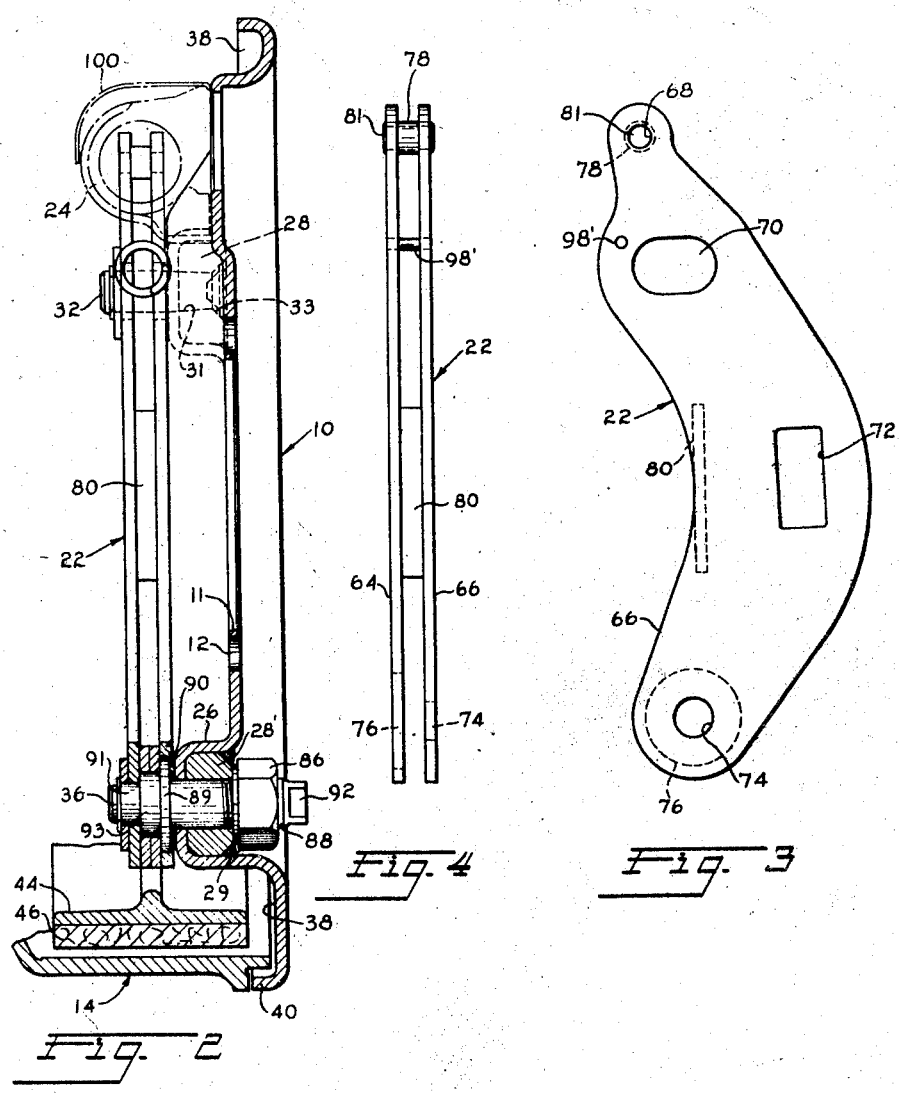

Patented Dec. 23, 1947

2,432,983

UNITED STATES PATENT OFFICE 2,432,983

BRAKE MECHANISM

Lawrence R. Buckendale and Ralph K. Super, Detroit, Mich., assignors to The Timken-Detroit Axle Company, Detroit, Mich., a corporation of Ohio Application October 28, 1944, Serial No. 560,850

9 Claims. (Cl. 188—78)

This invention relates to vehicle brake mechanisms and has particular reference to an improved brake mechanism of the general character disclosed in the United States Patents No. 2,337,069 and No. 2,337,070 and referred to in the art as floating shoe or "dual primary" brake mechanisms, and embodies improvements over United States Letters Patent No. 2,399,654, issued May 7, 1946, for Brake mechanism, in which we are co-inventors with Herbert W. Alden.

Vehicle brake mechanisms of the character disclosed in the above noted patents have been found to be wholly satisfactory as to the novel principles involved and generally satisfactory as to strustural details. The present invention relates mainly to improvements incorporated as the solution to problems encountered during the commercial development of the brake, particularly on a quantity production basis for medium weight vehicles. Solution of these various problems has resulted in the production of a new and improved brake mechanism having important advantages in manufacturing economy and facility and servicing characteristics.

With these and other considerations in view, the major object of the invention resides in the provision of an improved brake mechanism having a novel and inexpensive construction wherein the elements completely and efficiently perform their designated functions in the operative assembly.

A further object resides in the provision, in a brake mechanism of the type wherein the brake shoes are floatingly supported on pivoted abutments for automatically assuming full surface engagement with the brake drum when the brakes are applied, of novel abutment supporting anchor pins of special construction mounted in a novel manner on a special support.

A further object resides in the provision, in a brake mechanism of the type wherein the brake shoes are floatingly supported on pivoted abutments and are moved by pivoted shoe actuating levers, of novel pressure transmitting means between each shoe and the associated lever.

A still further object resides in the provision in a brake mechanism of the character indicated of an improved and novel support for mounting the brake mechanism on the axle housing adjacent the brake drum.

An additional object resides in the provision of novel brake shoe actuating levers of improved construction.

Other objects and advantages of the invention will be more particularly pointed out hereinafter or will be apparent from the following description taken in connection with the accompanying drawings or from the appended claims.

In the accompanying drawings, in which like reference numerals are used to designate corresponding parts throughout, there is illustrated a suitable mechanical embodiment for the purpose of disclosing the invention. The drawings, however, are illustrative only and are not to be taken in a limiting or restrictive sense since it will be apparent to those skilled in the art that various changes in the illustrated construction may be resorted to without in any way exceeding the scope of the invention.

In the drawings:

Figure 2 is a transverse sectional view substantially on line 2—2 of Figure 1;

Figure 3 is an elevational view of one of the shoe actuating levers shown in Figure 1;

Figure 4 is an edge elevational view of the lever shown in Figure 3;

Figure 1:
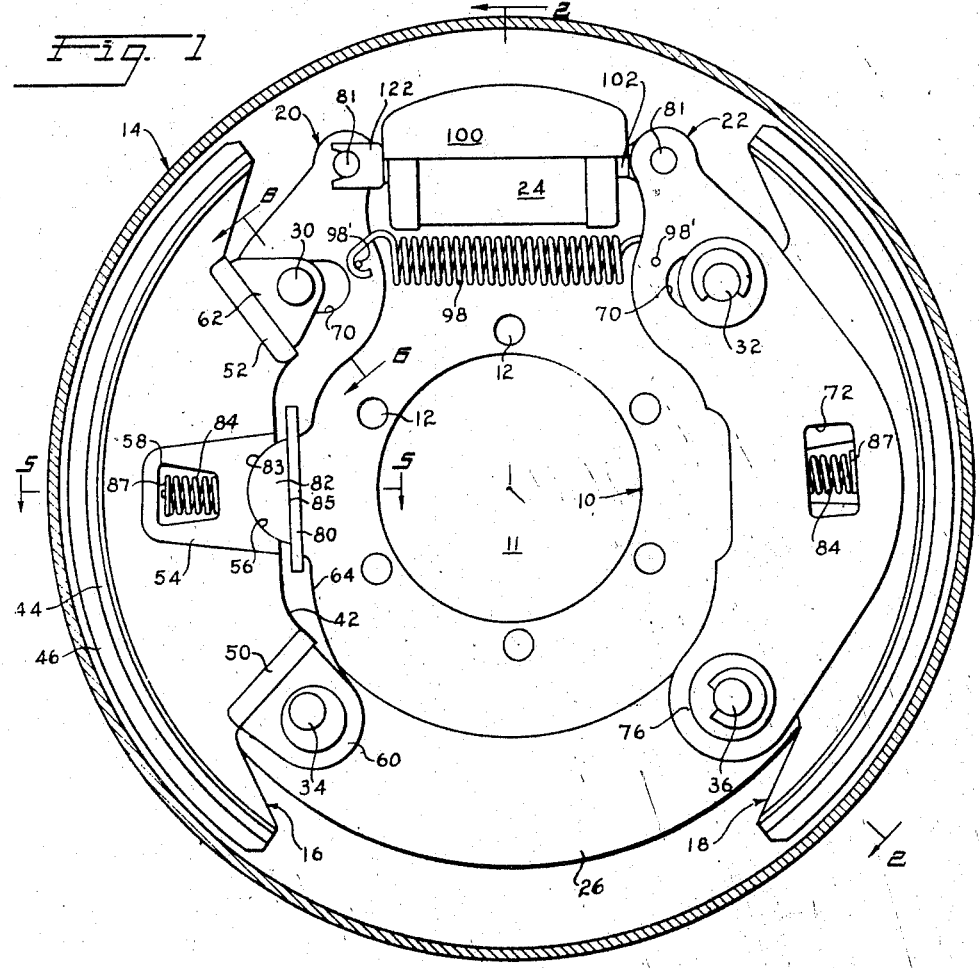
Figure 1 is a side elevational view partly in section of the improved brake mechanism with one of the brake lever plates omitted to illustrate the brake shoe and other parts therewith.

With continued reference to the drawings and particularly to Figures 1 and 2, the improved brake mechanism comprises a support 10 which is preferably a dust shield extending over one side of the brake mechanism as illustrated. Support 10, which will later be described in greater detail, is provided with a central aperture 11 through which a portion of the vehicle axle housing projects and is provided around this central aperture with apertures 12 through which extend rivets or bolts, not illustrated, which rigidly secure the support to a collar or flange provided on the axle housing, not illustrated, in a manner well known to the art.

A cylindrical brake drum, generally indicated at 14, has its open end substantially closed by the support member 10 and is secured to a vehicle wheel in some manner well known to the art, the wheel being rotatably mounted upon the axle housing, illustration of both the wheel and the axle housing having been omitted for the purpose of simplifying the illustration.

Within the drum there is disposed a pair of floating brake shoes, generally indicated at 16 and 18, respectively, which are forced into contact with the brake drum 14 by respective actuating levers, generally indicated at 20 and 22. These levers are pivotally mounted at adjacent ends on suitable anchor pins carried by the support member 10 and at their opposite ends are operatively associated with an expanding device such as the hydraulic wheel cylinder 24. As will be explained in detail, each brake shoe is rockably and slidably connected with an associated pivoted lever, the rocking connection permitting the shoe to freely seek full surface engagement with the drum when the brakes are applied, and the sliding connection permitting the rocking movement and relative adjustment between the lever and shoe. The brake drum may be of any suitable conventional or desired construction having the proper dimensions and suitable friction and heat dissipating characteristics.

The support member 10 preferably comprises a stamped sheet metal disc having the central aperture 11 surrounded by the rivet or bolt apertures 12 and having a circular periphery. Surrounding the central aperture and the bolting apertures 12, the plate is formed with an annular channel or recess 26 which is continuous around the plate except for a space at the top where it is discontinued for attachment of shoe expanding cylinder 24. Recess 26 faces away from the wheel carrying the brake drum.

Figures 5, 6:
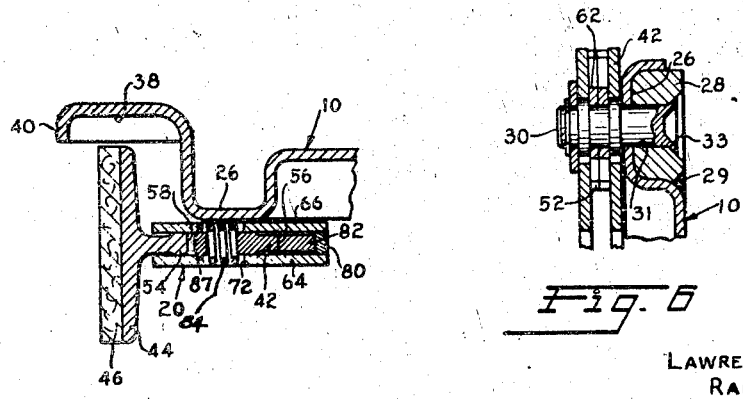
Figure 5 is a section substantially along the line 5—5 of Figure 1 illustrating the support shape and the manner in which the brake lever plates are interconnected.
Figure 6 is a detail elevation partly in section illustrating the manner of mounting the upper anchor pins.

For circumferentially spaced anchor pin mounting blocks, consisting of an upper pair 28, one of which is shown in section in Figure 6, and a lower pair 28', one of which is shown in section in Figure 2, are seated in the recess 26 and permanently welded in place therein, preferably by a suitable rod welding operation, as indicated at 29. Each of these blocks 28 and 28' has a cross sectional area substantially the same as the cross sectional area of the inside of the groove 26, as illustrated in Figures 2 and 6, and is substantially square in plan and provided with an anchor pin receiving central aperture. Blocks 28 preferably do not project out of recess 26.

The anchor pin receiving apertures through the two lower blocks are preferably cylindrical so as to permit concentric rotation of the anchor pins therein, but the anchor pin receiving apertures through the two upper blocks are frusto-conical and of decreasing taper towards the mouth of recess 26 as illustrated at 31. The smaller end of tapered aperture portion 31 terminates preferably in a flared shoulder 33. The tapered apertures in upper blocks 28 are adapted to receive the correspondingly tapered inner end portions of the upper, otherwise cylindrical, anchor pins 30 and 32. The smaller ends of these anchor pins 30 and 32 are upset or peened over on shoulders 33 to hold the pins rigidly and non-rotatably on the supporting blocks.

The two lower blocks 28' rotatably receive the adjustable anchor pins 34 and 36, the construction and function of which will be hereinafter described in greater detail. Around its outer edge, support 10 is provided with an annular recess 38 terminating in a flange or lip 40 which overlies the end of the brake drum 14 to restrict the entry of water and dirt into the brake mechanism.

Each brake shoe, as particularly illustrated at the left hand side of Figure 1, comprises an arcuate apertured web portion 42 having on its outer edge a wide integral flange 44 to which the brake lining 46 is suitably secured. At each end, the web 42 is provided with an integral thickened abutment portion, as indicated at 50 and 52, having flat guide faces inclined to radii of the brake mechanism and is formed at its center with a thickened portion 54 provided with an arcuate, preferably circular, recessed seat 56 in the inner edge of the web and with an aperture 58 between seat 56 and flange 44. Floating brake shoe 16 is chiefly supported by and extends between abutments 60 and 62 pivotally mounted on the anchor pins 34 and 30, respectively, and provided with flat abutment faces which substantially coextensively contact the flat guide faces of the brake shoe abutment portions 50 and 52 over considerable areas. These abutments are preferably the same as disclosed in said Patent No. 2,337,070.

The brake shoe actuating levers 20 and 22 are preferably identical in construction, and lever 22 has detailed illustration in Figures 2, 3 and 4. Each lever member comprises a pair of similar flat, thin metal parallel lever plates, as designated at 64 and 66. Each of these plates is somewhat arcuate in form and is provided with registered apertures of the same size indicated at 68, 70 and 72. Plates 64 and 66 are formed with axially aligned circular apertures 74 and 76, the latter being the larger and disposed on the side toward plate 10. In manufacturing this brake shoe actuating lever, the two plates 64 and 66 are pre-formed and mounted in a jig in parallel spaced superimposed relationship. A flat saddle bar 80, preferably of generally rectangular cross section, is disposed between the edges of the plates at approximately the mid-length of the inner concavely curved edges of the plates. Pressure is then applied to the plates to clamp the saddle bar in position and the plates are inductively butt-welded to the saddle bar. A hollow spacer thimble 78 is inserted between the plates at one end thereof concentric with the corresponding apertures 68, and a pin 81 is inserted through the plates and the spacer and peened over to secure plates 64 and 66 together. A pin 98' is inserted through apertures 73 and peened over to fit it to the lever. The apertures 70 are elongated along the width of the plates to prevent the upper anchor pin from interfering with pivotal movement of the lever, and the apertures 72 are substantially rectangular and elongated along the length of the plates to permit relative longitudinal adjustment between the lever and shoe.

The lever 22 and the brake shoe 18 are assembled together to provide a sub-assembly which is subsequently mounted on the support member 10. In assembling the lever member and the shoe, the web portion of the shoe is inserted between the two plates 64 and 66 of the lever member, a pressure block 82 being disposed between saddle bar 80 and the correspondingly arcuate seat 56 in the inner edge of the brake shoe web. Pressure block 82 has an arcuate edge face 83 slidably interfitting with seat 56 and a planar opposite edge face 85 slidably engaged with the adjacent planar face of saddle bar 80. The central aperture 58 in the brake shoe web is then brought into register with the aperture 72 in the lever and a compression spring 84 is inserted through these registering apertures in a manner such that one end exerts pressure against a spring seat 87 bridging the outer edge of the apertures 72 while the other end exerts pressure against the inner edge of aperture 58 in the brake shoe web, thereby applying the spring pressure to resiliently maintain web 42, pressure block 82 and saddle bar 80 in close frictional and motion transmitting engagement.

Following this sub-assembly, apertured abutment members 60 and 62 are inserted between the plates so that their apertures register with the apertures 74 and 70, respectively, and this assembly is then mounted on the backing plate so that the upper anchor pin 32 passes through the aperture 70 and corresponding upper abutment 62, while the lower anchor pin 36 passes through the apertures 76 and 74 and corresponding lower abutment 60. The elongation of slot 70 permits rocking of the lever about the lower anchor pin 36. As illustrated in Figure 2, lower anchor pin 36 is preferably a cylindrical bolt formed integrally with three circular enlarged portions, one of which 89 fills the circular aperture 76, another of which 91 fills the circular aperture 74, and an intermediate one of which 93 is eccentric to the bolt axis and fills the associated circular aperture in abutment member 60. The bolt portion filling the larger lever aperture 76 also serves as a shoulder which reacts against the force applied to the bolt by a nut 86 which is screw threaded upon the threaded portion 88 of the bolt to clamp anchor pin 36 firmly in place on backing plate 10. As is clearly illustrated in Figure 2, a two-way or alternate twist lock washer 90 is disposed between the shoulder and the adjacent surface of backing plate 10 to prevent rotation of the anchor pin bolt when the nut 86 is tightened. When nut 86 is tight, lever 22 is free to pivot on anchor pin 36.

Adjustment of the brake shoe may be obtained by loosening the nut 86 and rotating the anchor pin bolt, particularly eccentric 93, by means of the squared end portion 92 until the proper adjustment has been obtained, and the bolt is then clamped in adjusted position by tightening the nut 86. A similar assembly is made of the brake shoe 16 and lever 20 and this sub-assembly is mounted on the support member by the anchor bolt 34 and anchor pin 30.

The forked ends of the piston rods 102 and 122 of the brake cylinder 24 are brought into contact with the spacers 78 and a tension spring 98 is then connected at its opposite ends to the upper ends of the brake shoe levers by the pin connections at 98' to retract the brake shoes away from the brake drum when fluid pressure in the cylinder 24 is relieved.

A cupped or partly cylindrical metal shield 100 may be secured to the support member overlying the cylinder 24 to protect the cylinder from the heat radiated by the brake drum 14 to prevent heat deterioration of the fluid and the seals in the hydraulic cylinder.

The operation of the improved brake mechanism is similar to that described in United States Patents No. 2,337,069 and No. 2,337,070 referred to above, the geometry and relationships between the brake applying and retracting forces and the various frictionally engaged surfaces permitting compensating sliding between the brake shoe and lever being substantially as described in detail in said Patent No. 2,337,070.

When hydraulic fluid is forced into wheel cylinder 24 pistons, not illustrated, are forced outwardly moving the piston rods 102 and 122 to force the upper ends of the shoe actuating levers apart. As the levers swing about their pivotal connections on the respective lower anchor pins the brake shoes are moved outwardly to contact the brake drum. Force is applied to the shoes through the respective saddle bars, pressure blocks and shoe webs and as the shoes tend to rotate with the brake drum corresponding ends of the shoe webs are brought into pressure contact with associated abutment members. The angular relationship between the ends of the shoe webs and the associated abutment members is such that the heel portion of each shoe is forced outwardly to press against the brake drum with a force equal to that exerted by the toe portion of the shoe, thus maintaining full surface contact and uniform pressure distribution between the shoe linings and the brake drum. Because of the symmetrical arrangement of the abutment members the above condition obtains regardless of the direction of rotation of the brake drum.

When the fluid pressure is released retraction spring 98 pulls the upper ends of the levers together and the brake shoes are constrained to follow the inward movement of the levers by the compression springs 84 and 86.

The improved construction provides many advantages in manufacture and servicing and makes available on a quantity production basis an economical brake, especially for medium weight vehicles, having all of the advantages of the floating shoe or "dual primary" brake disclosed in United States Patents No. 2,337,069 and No. 2,337,070 referred to above.

The improved support plate 10 functions as both a brake shoe and shoe lever support and a shield for excluding water and dirt from the interior of the brake. The formed annular channel or recess 26 gives the support structural strength with a minimum of metal. Welding the anchor pin supporting blocks directly into the annular channel formed in support 10 reinforces the anchor pins and eliminates the need for the special bracket member previously used to support the lower anchor pins and the reinforcement plates found necessary at the upper anchor pins in prior constructions. The support blocks may be formed from suitable bar stock with no forging or casting operations and a minimum of machining operations.

The improved method of securing the upper anchor pins also leads to important manufacturing economy and freedom from service trouble. By inserting the tapered shank portions of these pins into the tapered apertures in the corresponding support blocks and expanding or upsetting the ends, the threaded fastenings previously used on upper anchor pins are eliminated and at the same time they are so rigidly and permanently secured in place that no service attention is required.

Substituting the alternate twist lockwashers for the serrations previously used to releasably lock the adjustable lower anchor pins or bolts in adjusted position also results in material manufacturing economy and lessens service trouble since the shoes can be somewhat more accurately adjusted and wear can be compensated by using a new lockwasher whenever necessary.

To further facilitate manufacture the support member, the lever plates, the abutment members and various other parts, such as the retaining washers and clips, may be made as sheet metal stampings and, where necessary, these sheet metal parts are welded to other parts to provide the brake elements in the most effective and convenient manner. Under the invention, we also contemplate making and selling the levers, the completed lined shoes and/or the lever and shoe combinations as sub-assemblies for manufacture of the completed brake.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In vehicle brake mechanism including brake shoes adapted to cooperate with a drum, and pivoted levers operatively associated with said shoes; a support for said shoes and levers comprising an apertured disk having a circumferentially extending channel disposed radially outwardly of said aperture, a plurality of apertured support blocks fixed in said channel, and brake shoe abutment pivot members mounted in said support blocks for supporting said brake shoes and said pivoted levers, one of said pivot members associated with each brake shoe being rotatably adjustable in its block for compensating for lining wear.

2. A vehicle brake as defined in claim 1, wherein one of said pivot member support blocks for each brake shoe has a tapered aperture and the corresponding pivot member has a tapered portion fixedly secured in said aperture.

3. A vehicle brake as defined in claim 1, wherein said channel has a depth substantially as great as its width and said support blocks have a cross sectional area substantially as great as the cross sectional area of said recess.

4. A vehicle brake as defined in claim 1, wherein said support comprises a relatively thin metal stamping and, in addition to said channel, is formed around its outer periphery with an oppositely facing annular recess adapted to extend over the edge of said brake drum.

5. A brake shoe actuating lever for a vehicle brake mechanism comprising a pair of metal plates fixed in parallel spaced relation, said lever being formed with an anchor pin accommodating apertures adjacent its ends and an enlarged aperture intermediate its ends, and a metal saddle bar permanently bonded between said plates and having a planar surface disposed longitudinally of the lever and facing in the direction of said aperture, said saddle bar being butt-welded to said plates.

6. In a vehicle brake having a support, a brake shoe abutment and a shoe actuating lever movably mounted on said support; pivot means for said abutment and said lever comprising a bolt extending through said support and having a threaded portion on the side of said support remote from said abutment and lever and an eccentric flange on the side of said support adjacent said abutment and lever for operative association with the brake shoe, a nut on the threaded portion of said bolt, a shoulder on said bolt facing said support, and a two way lock washer clamped between said shoulder and the adjacent surface of said support surrounding said bolt.

7. A brake mechanism support comprising a plate-like member having an aperture for receiving an axle housing connection or the like, a channel integrally formed in said member radially outwardly of said aperture and extending at least partly about said aperture, and a plurality of spaced brake anchor pin mounting blocks fixed within said recess, each of said blocks having substantially the same cross sectional area as said recess so as to substantially fill that portion of the recess in which it is disposed.

8. In a brake mechanism, a support plate formed with a channel, an anchor pin mounting block permanently secured within said channel, and an anchor pin having one end rigidly and non-rotatably secured to said block and projecting through the bottom of said channel outwardly of said block so that its other end is available as a brake mechanism pivot, said block and the one end of said anchor pin having interfitting tapered sections whereby during assembly said pin is inserted into the block through the apertured bottom of the channel.

9. In a vehicle brake mechanism, a support, a substantially continuous channel formed in said support, a plurality of spaced anchor pin mounting blocks rigidly secured with said channel, anchor pins carried by said blocks, the upper anchor pins being rigid with their associated blocks and the lower anchor pins being rotatably adjustable in their associated blocks, brake levers pivoted on said lower anchor pins on the side of said support opposite the open side of said channel, brake shoes slidably connected at opposite ends with pivoted abutments on said anchor pins and resiliently rockably and slidably interconnected with said pivoted levers, means on said support extending between the upper ends of said levers operable for simultaneously pivoting said levers in opposite directions, and a return spring connected between said levers adjacent the upper ends thereof.

LAWRENCE R. BUCKENDALE.
RALPH K. SUPER.

REFERENCES CITED

The following references are of record in the file of this patent:

UNITED STATES PATENTS

| Number | Name | Date |
|---|---|---|
| 2,337,069 | Spiller | Dec. 21, 1943 |
| 2,337,070 | Alden | Dec. 21, 1943 |
| 1,816,155 | Perrot | July 28, 1931 |
| 2,031,717 | Kohr | Feb. 25, 1936 |
| 2,047,556 | Harvey | July 14, 1936 |
| 2,311,765 | Loweke | Feb. 23, 1943 |